United States Patent

[11] 3,593,096

[72] Inventor Harold R. Newell
 South Newbury, N.H.
[21] Appl. No. 850,545
[22] Filed Aug. 15, 1969
[45] Patented July 13, 1971
[73] Assignee Mesur-Matic Electronics Corporation
 Warner, N.H.

[54] PULSE CONTROL CIRCUIT FOR STEP MOTORS
 6 Claims, 4 Drawing Figs.
[52] U.S. Cl. .................................................. 318/696,
 318/341
[51] Int. Cl. ...................................................H02k 37/00
[50] Field of Search............................................ 318/138,
 254, 341, 194, 685, 696

[56] References Cited
 UNITED STATES PATENTS
3,328,658 6/1967 Thompson................... 318/138
3,345,547 10/1967 Dunne......................... 318/138

Primary Examiner—G. R. Simmons
Attorney—Hurvitz, Rose & Greene

ABSTRACT: A control circuit for supplying pulses to sequentially excite the windings of a multiple phase step motor includes a generator for supplying stepping pulses at a preselected repetition rate. In response to each of these stepping pulses, a further portion of the control circuit produces a series of further pulses, each series containing an identical number of pulses, less than the number of phases of the step motor, and the pulses in each series occurring at a rate sufficiently greater than the repetition rate of the original stepping pulses that at the conclusion of each series of further pulses the motor has adequate time to respond mechanically to the excitation of windings produced by that series of pulses prior to initiation of the next successive series of pulses.

PATENTED JUL 13 1971 3,593,096
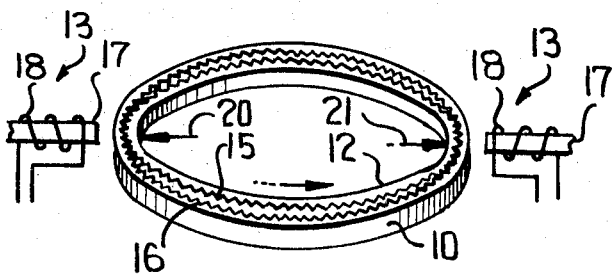
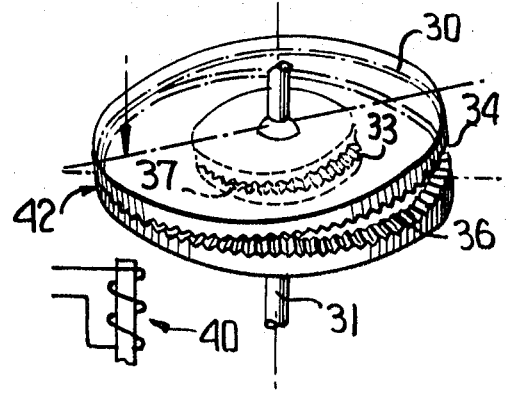
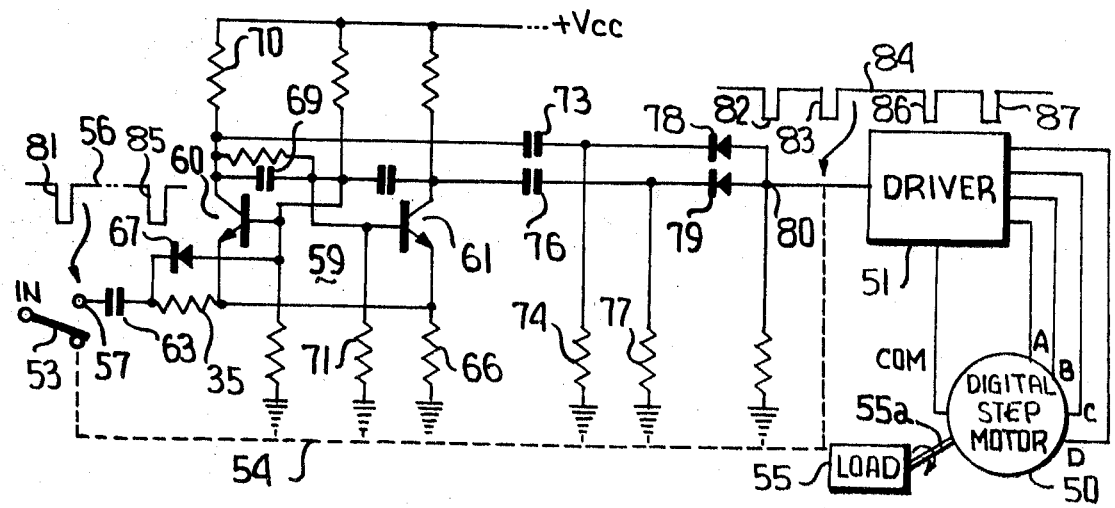
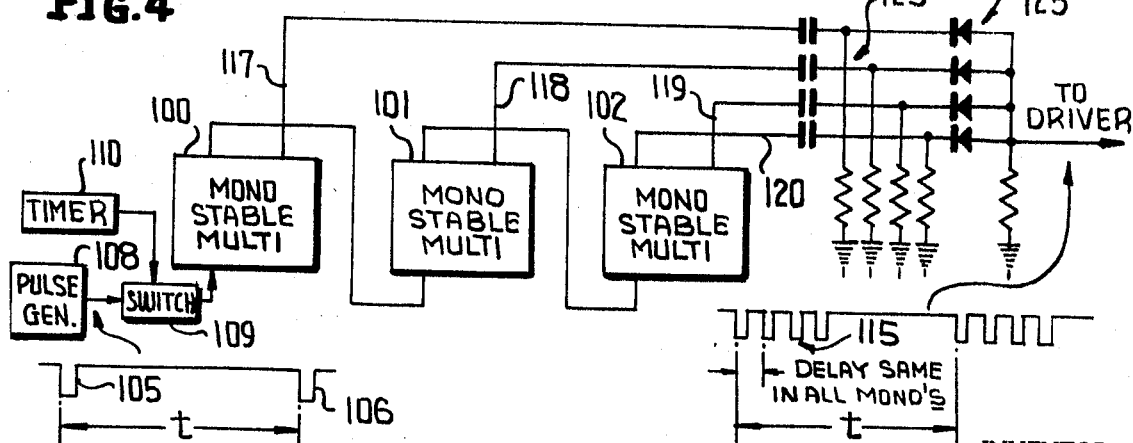
INVENTOR
HAROLD R. NEWELL
BY Hurvitz, Rose & Greene
ATTORNEYS

3,593,096

PULSE CONTROL CIRCUIT FOR STEP MOTORS

BACKGROUND OF THE INVENTION

The present invention relates generally to control circuits for step motors, and in particular to a step motor pulsing circuit by which the field windings of the motor are energized at a rapid rate with a related improvement in accuracy of stepping.

In a typical step motor, a shaft is driven in rotation at increments in synchronism with driving pulses supplied to the field windings of the motor. The mechanical response to alteration of the magnetic field accompanying energization of the field windings in a predetermined switching format places an upper limit on the repetition frequency of pulses to be utilized to energize the windings.

However, greater positioning accuracy of the motor shaft may be achieved by providing for two or more steps or increments of shaft rotation in place of a single step. Since positioning error is noncumulative over a given set of steps, i.e., is primarily attributable to undershoot or overshoot at the final step of a sequence of steps, increasing the number of steps required for the motor shaft to move through a given angle by a predetermined factor is tantamount to improving the positioning accuracy by that same factor.

It is therefore a principal object of the present invention to provide apparatus that will permit accurate positioning of the motor shaft with pulses delivered at a rate exceeding the normal rate to provide maximum impetus to the moving elements of the motor and thereby reduce the time to achieve the rest position, while simultaneously improving positioning accuracy.

SUMMARY OF THE INVENTION

Briefly, according to the present invention circuitry is provided which responds to each of a series of incoming pulses occurring at a constant repetition rate to generate a set of further pulses at a much faster rate within a period sufficiently less than the interval between consecutive ones of the incoming pulses that time is available for the mechanical response of the motor to be effected prior to initiation of the next set of further pulses by the following incoming pulse. In other words, each incoming pulse triggers a burst of further pulses which terminates a length of time prior to the next successive incoming pulse to permit mechanical recovery of the motor in response to the burst of further pulses. The set or burst of further pulses is less than the total number of phases of the motor.

BRIEF DESCRIPTION OF THE DRAWINGS

FIG. 1 is a simplified diagram, in perspective view, of a basic step motor with which the present invention may be used;

FIG. 2 is a simplified diagram, in perspective view, of another basic step motor with which the present invention may be used;

FIG. 3 is a circuit diagram of one embodiment of the present invention for producing a set of two energizing pulses for application to the step motor windings, in response to each single incoming pulse; and FIG. 4 is a circuit diagram of another embodiment of the present invention for producing a set of more than two energizing pulses.

DESCRIPTION OF THE PREFERRED EMBODIMENTS

Referring to FIG. 1, there is shown a typical fundamental structure for use in step motors employing what is known as "harmonic drive" or "strain wave gearing" to produce incremental high torque rotary motion in response to application of electrical control pulses. The basic concepts and several practical applications of such step motor structure are discussed in considerable detail in the prior art, for example in U.S. Pat. No. 2,906,143 to Musser, and need not be belabored here. It is sufficient to note that a conventional embodiment of a "harmonic drive" system comprises a rigid circular gear or spline 10, a cooperating flexible ring gear or spline 12 of different diameter and number of teeth from the diameter and number of teeth, respectively of rigid gear 10, and a strain inducer such as a plurality of electromagnetic actuators 13. Flexible gear 12 is disposed coaxially within rigid gear 10 with the teeth 15, 16, respectively, of the two gears positioned in confronting relation.

In operation of the gearing system of FIG. 1, the strain inducer 13, which, while here shown only as a single phase consisting of diametrically opposite cores 17 accommodating a single winding 18, is composed of a plurality of electromagnetic actuator pairs 13 positioned radially about the outer rigid gear 10, deforms the inner flexible gear 12 (composed of magnetically permeable material) to produce meshing of the teeth of the two gears at a pair of areas designated by the heads of arrows 20 and 21. The two areas of meshing are separated by regions in which incomplete contact or no contact exists between the gears, as a result of the difference in diameter therebetween and the distortion of the flexible gear. Sequential energization of the actuator pairs 13 (strain inducers) about the rigid gear results in relative rotation of the flexible gear 12 and of any driven element, such as a shaft (not shown), connected thereto, by virtue of the difference in number of teeth of the two gears. If the number of teeth on each gear is large, and the tooth differential is small, say one tooth, it will be observed that the flexible gear rotates very slowly, requiring a great number of energizations of the total number of phases of the motor to undergo one complete revolution (i.e., rotation through 360°). The areas of meshing relationship of the gears are peripherally propagated in the form of a sinusoidal wave representative of a wave deflection in one of the gears, and hence referred to as a strain wave. Motors using this principle are manufactured by United Shoe Machinery Corp., (USM), Boston, Mass. under the trademark "Responsyn."

Another type of electromagnetic step motor is shown in basic form in FIG. 2, and is described in detail in my copending application for U.S. Pat. entitled "Electromagnetic Harmonic Drive for Digital Step Motors," Ser. No. 627,410 filed Mar. 31, 1967. Accordingly, a brief description will suffice here. The motor includes a wobble plate or disc 30 coupled to a shaft 31 for relative rotation, longitudinal pivoting, and slight axial movement relative thereto. Plate 30 supports two coaxial ring gears 33 and 34 having teeth jutting from the underside of the plate as viewed in FIG. 2. A stationary ring gear 36 is mounted to the motor housing (not shown) and a further ring gear 37 coaxial therewith is fastened to motor shaft 31. The diameters of the gears are such that gears 33 and 37 may mesh and gears 34 and 36 may mesh, but at least the number of teeth on gears 33 and 37 differ.

Thus, when wobble plate 30 is tilted about shaft 31 by successive energization of the field windings or phases of a plurality of electromagnetic actuators 40, only one of which is shown, the plate "wobbles around" on the shaft to produce rotation of a single sector of mating engagement of the two pairs of gears, this sector designated by reference numeral 42. Since a tooth differential exists between gears 33 and 37, the two undergo relative rotation, and hence shaft 31 rotates, as the plate 30 wobbles. As in the motor of FIG. 1, if the number of teeth on each of gears 33 and 37 is much larger than the tooth differential therebetween, the shaft rotates very slowly in increments as the motor phases are sequentially energized. Step motors using this principle are manufactured by Mesur-Matic Electronics Corp. (MM), Warner N. H.

Referring now to FIG. 3, an embodiment of the present invention suitable for high-speed energization of step motors conforming to either of the fundamental arrangements illustrated in FIGS. 1 and 2, has the field windings or phases A, B, C, D of the step motor 50, as well as the common (COM) lead of the motor connected to a driver 51. Driver 51 supplies the energizing pulses to the field windings in a predetermined switching format. While only four motor phases are shown in FIG. 3, this is purely by way of example, the number of phases depending upon such factors as smoothness, accuracy, and expense of the motor to be used. The present invention is quite suitable for use with four-phase and eight-phase USM Responsyn step motors, and with eight-phase and 16-phase MM step motors.

Step control pulses may normally be supplied to driver 51 via a switch 53 and a circuit path 54 (shown as a dotted line in Figure 3) when high-speed pulsing is not desired. Normal pulse operational control of the motor results in discrete motion of the motor shaft through as many as several hundred angular increments per revolution. An inertial load 55 rigidly coupled to the motor shaft 55a may thereby be positioned with relatively high accuracy.

When higher speed stepping is desired, pulses 56 at the normal rate are selectively supplied via switch 53, whose blade is now closed to contact 57, to a special operational mode control circuit in accordance with my invention. The control circuit includes a monostable (one-shot) multivibrator (MV) 59. Initially, when multivibrator 59 is in its stable state during operation of the circuit, transistor stage 60 is nonconductive (i.e., "off") and transistor stage 61 is conductive (i.e., "on"), as established by the clamped base of the latter and the cutoff bias normally present at the base of the former. An incoming negative-going pulse at terminal 57 is differentiated by a circuit comprising capacitor 63 and resistors 35 and 66 to supply a negative-going sync trigger via diode 67 to the base of transistor 60, thereby switching that transistor to an "on" condition. Accordingly, the base of transistor 61 is pulled to ground potential, and transistor 61 is turned "off". The multivibrator is now in its quasi-stable state, and will spontaneously return to the stable state only after a predetermined delay time that depends on the circuit parameters of the multivibrator.

In particular, the one-shot MV remains in its quasi-stable state until such time as capacitor 69 charges to a voltage level exceeding the cutoff bias at the base of transistor 61, as determined by the time constant established by capacitor 69 and resistors 70 and 71 and as determined by the voltage level of supply $V_{cc}$. At that point, MV 59 returns to its stable state until the next pulse is applied to the base of transistor 60.

The above-described operation produces a negative pulse (relative having $V_{cc}$) at the collector of transistor 60, followed by a negative pulse at the of transistor 61, as each is turned "on" in sequence. These pulses are separated by the delay or recovery time of the multivibrator and are differentiated by respective circuits consisting of capacitor 73 and resistor 74 and of capacitor 76 and resistor 77. Diodes 78 and 79 pass the negative pulses while clipping any positive portions to provide clean pulses to the driver 51 at node termination Thus, incoming pulse 81 of pulse sequence 56 results in the set of output pulses 82 and 83 of pulse sequence 84, and incoming pulse 85 results in output pulses 86 and 87. Output pulses 82 and 86 are separated by an identical time interval to that between incoming pulses 81 and 85. Moreover, the delay time of MV 59 is selected such that the second pulse of each set of outgoing pulses terminates with greater time left in the time interval between the first pulses of consecutive sets of output pulses than the mechanical response time of the step motor to a pulse applied to the windings (i.e., to excite the corresponding phases) thereof. That is, sufficient time should be left in the interval between consecutive incoming pulses upon conclusion of the last pulse of the set of output pulses deriving from the respective incoming pulse, to ensure that the mechanical portions of the motor will have sufficient operational time to "catch up" prior to application of the next set of output pulses to driver 51.

The number of output pulses produced in each set in the circuit of FIG. 3 is only two, but in any case that number should usually be less than the number of phases of the multiphase step motor 50 whose operation is being controlled. This is to ensure that the motor will not "skip" a complete set of excited phases as a consequence of application of pulses at too rapid a repetition rate, and respond only to the pulses producing excitation of the phases in the immediately succeeding repetition. An identical number of pulses to that supplied to driver circuit 51 are applied by the driver to the step motor windings (i.e., to phases A, B, C, D) to sequentially excite the motor phases in a predetermined format. Usually, that format is simply the sequence A, B, C, D (or the reverse for counterclockwise operation), although it is sometimes desirable that more than a single winding be excited at a time, e.g., adjacent windings undergoing simultaneous excitation.

Referring now to FIG. 4, an embodiment of the invention is shown in which more than two pulses are produced for each incoming pulse. To that end, the control circuit contains $n$ cascaded monostable multivibrator stages, here illustrated as the three stages 100, 101, and 102. In practice, the number $n$ of stages is equal to or greater than one, and is one less than the number of pulses to be produced in each set or series of pulses in response to each of the incoming stepping pulses. In the embodiment of FIG. 4, a series of four pulses is generated in response to each incoming pulse, such a series being particularly suitable for exciting an eight-phase step motor. In general, the number of pulses in each series is preferably equal to half the number of motor phases.

In the circuit of FIG. 4, stepping pulses such as 105, 106 separated by a time $t$ and occurring at a preselected repetition rate are generated by generator 108 and are selectively applied to the first monostable multivibrator stage 100 via a switch 109 and a timing circuit 110 to hold the stepping pulses to a predetermined number. Each monostable multivibrator stage 100, 101, 102 is identical to stage 59 of FIG. 3 and includes differentiating network and diode as previously described. However, only stage 100 responds to the incoming stepping pulses from generator 108. The remaining stages are connected to receive the pulse generated by the immediately preceding stage when that immediately preceding stage spontaneously returns to its stable state from the quasi-stable state after the selected delay time built into each MV stage. Each stage has the same delay time, such that the output pulses 115 in each series or set of output pulses are equally spaced from one another.

Each series of output pulses is obtained from the pulses produced by the cascaded MV stages, in the sequence and with the spacing produced by those stages. To this end, the first pulse in each series 115 is that produced by stage 100 on output lead 117 when that stage is triggered to the quasi-stable state by an incoming stepping pulse such as 105. Similarly, the pulses produced by stages 101 and 102 when triggered to their respective quasi-stable states by the stable state return pulse of the respective immediately preceding stages, are taken from leads 118 and 119. In addition, the pulse produced by the last stage, 102, upon spontaneous return to its stable state is also taken as the last pulse of the series, on lead 120. Each of these negative-going pulses is supplied to a separate differentiating network of set 123 and thence passed by a separate diode of set 125 for application of the series of pulses to a motor driven circuit and then on to the step motor windings, in a manner similar to that described in conjunction with FIG. 3. As shown in the output pulse waveform 127, the first pulse of each series 115 is separated from the first pulse in the next consecutive series by a time $t$ equal to the time between consecutive incoming stepping pulses such as 105 and 106.

In the USM Responsyn series of step motors the four-phase and eight-phase motors may have two steps and up to four steps (inclusive), respectively, initiated at a much faster rate than normal without "losing" steps, and with a proportionate increase in step accuracy. Similar advantages are obtained with MM eight-phase and 16-phase step motors by initiation of up to four steps and up to eight steps (inclusive), respectively.

I claim:

1. In combination with a multiphase step motor having mechanical means for incrementally rotating a load in response to driving pulses applied in a preselected sequence to field windings of the motor to excite the respective motor phases, and with a driver circuit for supplying said driving pulses in response to input pulses applied thereto, said mechanical means of said motor having a known response time to the excitation of said motor phases before said load is rotated,
  means for generating pulses at a predetermined constant repetition rate,
  means responsive to incoming pulses occurring at a constant repetition rate for producing a set of serial pulses at a constant rate greater than said predetermined rate for each incoming pulse, each said set of pulses containing an identical number of pulses less than the total number of phases of said step motor, and each said set of pulses terminating a length of time prior to the onset of the next successive incoming pulse greater than said response time of said mechanical means to a number of said driving pulses equal to the number of pulses in each said set,
  means for selectively applying pulses generated by said generating means to said pulse set producing means as the incoming pulses therefor, and
  means for supplying the sets of pulses produced by said pulse set producing means to said driver circuit to provide a synchronized corresponding number of driving pulses from said driver circuit to the field windings of said motor,
wherein said pulse set producing means includes monostable multivibrator means having $n$ monostable multivibrator stages in cascade, where $n$ is an integer $\geq 1$ and is one less than the number of pulses in each said set, each of said multivibrator stages being normally in a stable state and having a quasi-stable state to which the respective stage is triggered in response to an incoming pulse, and having a predetermined delay time between assumption of said quasi-stable state and spontaneous return to said stable state selected to permit termination of each said set of pulses said length of time prior to onset of the next successive incoming pulse to said pulse set producing means, the first said multivibrator stage connected to receive the incoming pulses to said pulse set producing means, and each succeeding multivibrator stage connected to receive an incoming pulse from the immediately preceding stage upon spontaneous return of said immediately preceding stage to its stable state, said pulse set producing means further including means responsive to a pulse produced by each multivibrator stage upon being triggered to its quasi-stable state and further responsive to the pulse produced by the last multivibrator stage upon return to its stable state for supplying those pulses in the sequence produced to said driver circuit supplying means.

2. The combination according to claim 1 wherein $n=1$.

3. The combination according to claim 1 wherein the number of pulses in each said set is equal to half the total number of motor phases.

4. A control circuit for supplying pulses to sequentially excite the windings of a multiple phase step motor, said control circuit including,
  means for generating stepping pulses at a preselected pulse repetition rate,
  means responsive to said stepping pulses to produce for each stepping pulse a series of further pulses at a rate greater than said preselected rate, each said series of further pulses containing an identical number of pulses less than the number of motor phases, said greater rate being sufficiently rapid to terminate each series of further pulses with sufficient time remaining prior to production of the next successive stepping pulse to allow mechanical response of the motor to a like series of pulses applied to sequentially excite the windings thereof, and
  means responsive to each series of further pulses produced by said pulse series producing means for supplying a like series of pulses to said motor windings in a preselected sequential format, wherein said pulse series producing means comprises a monostable multivibrator, said multivibrator having a stable state in which it is normally operative and having a quasi-stable state into which it is triggered in response to one of said stepping pulses, and having a preselected delay time in which it spontaneously reassumes its stable state after having been triggered to the quasi-stable state, said delay time being sufficiently less than the interval between consecutive ones of said stepping pulses to provide said remaining time following each said series of further pulses, said multivibrator generating a first pulse upon assumption of its quasi-stable state and generating a second pulse upon return to its stable state.

5. The invention according to claim 4 wherein said pulse series producing means further includes means for supplying said first and second pulses as a series of said further pulses.

6. The invention according to claim 4 wherein said pulse series producing means comprises a plurality of cascaded stages of monostable multivibrators each corresponding to the first-named monostable multivibrator, the number of said cascaded stages being one less than the number of pulses in each said series of further pulses, the first stage of said cascaded stages connected to receive stepping pulses from said stepping pulse generating means, each succeeding stage connected to receive said second pulse from the immediately preceding stage, and means for supplying said first pulse of each stage and the second pulse of the last stage in the sequence and spacing produced, as a series of said further pulses.